United States Patent
Mizuno et al.

(10) Patent No.: US 10,782,558 B2
(45) Date of Patent: *Sep. 22, 2020

(54) DISPLAY DEVICE

(71) Applicant: Japan Display Inc., Tokyo (JP)

(72) Inventors: Manabu Mizuno, Tokyo (JP); Kentaro Okuyama, Tokyo (JP); Hiroshi Inamura, Tokyo (JP); Hideki Kaneko, Tokyo (JP); Hiroki Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,976

(22) Filed: Sep. 16, 2019

(65) Prior Publication Data

US 2020/0012149 A1 Jan. 9, 2020

Related U.S. Application Data

(63) Continuation of application No. 15/441,508, filed on Feb. 24, 2017, now Pat. No. 10,416,493.

(30) Foreign Application Priority Data

Mar. 14, 2016 (JP) .................................. 2016-049962

(51) Int. Cl.
*G02F 1/1335* (2006.01)
*G02F 1/1368* (2006.01)
(Continued)

(52) U.S. Cl.
CPC ........ *G02F 1/133553* (2013.01); *G02F 1/137* (2013.01); *G02F 1/1334* (2013.01);
(Continued)

(58) Field of Classification Search
CPC ............. G02F 1/133553; G02F 1/1334; G02F 1/136286; G02F 1/1368; G02F 1/137; G02F 2201/121; G02F 2201/123
See application file for complete search history.

(56) References Cited

U.S. PATENT DOCUMENTS

2002/0154256 A1  10/2002  Gotoh et al.
2006/0139526 A1* 6/2006  Ahn ................... G02F 1/133555
 349/114
(Continued)

FOREIGN PATENT DOCUMENTS

JP  H09-197381 A  7/1997
JP  11-119206      4/1999
(Continued)

OTHER PUBLICATIONS

Japanese Office Action dated Jan. 21, 2020 in corresponding Japanese Application No. 2016-049962.

*Primary Examiner* — Nathanael R Briggs
(74) *Attorney, Agent, or Firm* — K&L Gates LLP

(57) ABSTRACT

A display device according to one aspect of the present invention includes a first substrate including at least a pixel electrode and a pixel switching circuit portion, a second substrate arranged to face the first substrate, a liquid crystal layer arranged between the first substrate and the second substrate, and configured to modulate light, the light being propagated while reflected between the first substrate and the second substrate, and a reflecting layer arranged over a liquid crystal layer side of the pixel switching circuit portion, partially superimposed with the pixel switching circuit portion, and electrically coupled with the pixel electrode, the reflecting layer having higher reflectance of the light than any members included in the pixel switching circuit portion.

13 Claims, 11 Drawing Sheets

(51) Int. Cl.
*G02F 1/1362* (2006.01)
*G02F 1/1334* (2006.01)
*G02F 1/137* (2006.01)

(52) U.S. Cl.
CPC ...... *G02F 1/1368* (2013.01); *G02F 1/136286* (2013.01); *G02F 2201/121* (2013.01); *G02F 2201/123* (2013.01)

(56) References Cited

U.S. PATENT DOCUMENTS

| | | |
|---|---|---|
| 2007/0170430 A1 | 7/2007 | Nakagawa |
| 2010/0085510 A1 | 4/2010 | Okuyama et al. |
| 2010/0134734 A1 | 6/2010 | Kim et al. |
| 2010/0165450 A1 | 7/2010 | Okuyama et al. |
| 2011/0109663 A1 | 5/2011 | Uchida et al. |
| 2011/0141551 A1 | 6/2011 | Uchida et al. |
| 2011/0242146 A1 | 10/2011 | Uchida et al. |
| 2012/0274867 A1 | 11/2012 | Shinkai et al. |
| 2013/0229595 A1 | 9/2013 | Shinkai et al. |
| 2015/0109763 A1* | 4/2015 | Shinkai ............ G02F 1/133615 362/97.2 |
| 2016/0116768 A1 | 4/2016 | Okuyama et al. |
| 2016/0163271 A1 | 6/2016 | Sakaigawa et al. |
| 2017/0031187 A1 | 2/2017 | Douyou |
| 2017/0255072 A1 | 9/2017 | Kaneko et al. |

FOREIGN PATENT DOCUMENTS

| | | |
|---|---|---|
| JP | 2001-318367 A | 11/2001 |
| JP | 2003-140566 A | 5/2003 |
| JP | 2007-199188 A | 8/2007 |
| JP | 2008-089867 A | 4/2008 |

* cited by examiner

DISPLAY DEVICE

CROSS-REFERENCE TO RELATED APPLICATIONS

This application is a continuation application of U.S. patent application Ser. No. 15/441,508, filed on Feb. 24, 2017, which application claims priority from Japanese Application No. 2016-049962, filed on Mar. 14, 2016, the contents of which are incorporated by reference herein in its entirety.

BACKGROUND

1. Technical Field

The present disclosure relates to a display device.

2. Description of the Related Art

A display device provided with a backlight on a back surface of a display panel is known (for example, Japanese Patent Application Laid-open Publication No. 2003-140566). However, in recent years, display devices that allow light to directly enter from a side surface of a display panel without having a backlight have been developed. In these display devices, a polymer dispersed liquid crystal layer is provided inside the display panel, and display is performed such that the light propagated inside the display panel is scattered in the liquid crystal layer. This sort of display devices is used in a form that the other side of a screen can be seen through, and thus is called transparent display.

The light entering from the side surface of the display panel is attenuated during the process of propagation inside the display panel. Therefore, an image becomes darker in a position more distant from a light source, and luminance non-uniformity occurs in the display screen. As a reason of the attenuation, high light absorbance of amorphous silicon used for a thin film transistor and of Mo and Ti used for metal wiring can be considered. The light entering the thin film transistor may become a cause of light leakage.

SUMMARY

A display device according to one aspect of the present invention includes: a first substrate including at least a pixel electrode and a pixel switching circuit portion; a second substrate arranged to face the first substrate; a liquid crystal layer arranged between the first substrate and the second substrate, and configured to modulate light, the light being propagated while reflected between the first substrate and the second substrate; and a reflecting layer arranged over a liquid crystal layer side of the pixel switching circuit portion, partially superimposed with the pixel switching circuit portion, and electrically coupled with the pixel electrode, wherein the reflecting layer has higher reflectance of the light than any members included in the pixel switching circuit portion.

DETAILED DESCRIPTION

Forms for implementing the invention (embodiments) will be described in detail with reference to the drawings. The present invention is not limited by content described in the embodiments below. Configuration elements described below include elements easily conceived by a person skilled in the art and elements substantially the same. Further, the configuration elements described below can be appropriately combined. The disclosure is merely an example, and appropriate modifications which maintain the points of the invention, and which can be easily arrived at by a person skilled in the art, are obviously included in the scope of the present invention. To make description more clear, the drawings may be schematically illustrated in the width, thickness, shape, and the like of respective portions, compared with actual forms. However, such illustration is merely an example, does not limit the construction of the present invention. In the present specification and drawings, elements similar to those described with respect to the drawings that have already been mentioned are denoted with the same reference signs, and detailed description may be appropriately omitted.

First Embodiment

Figure 1:
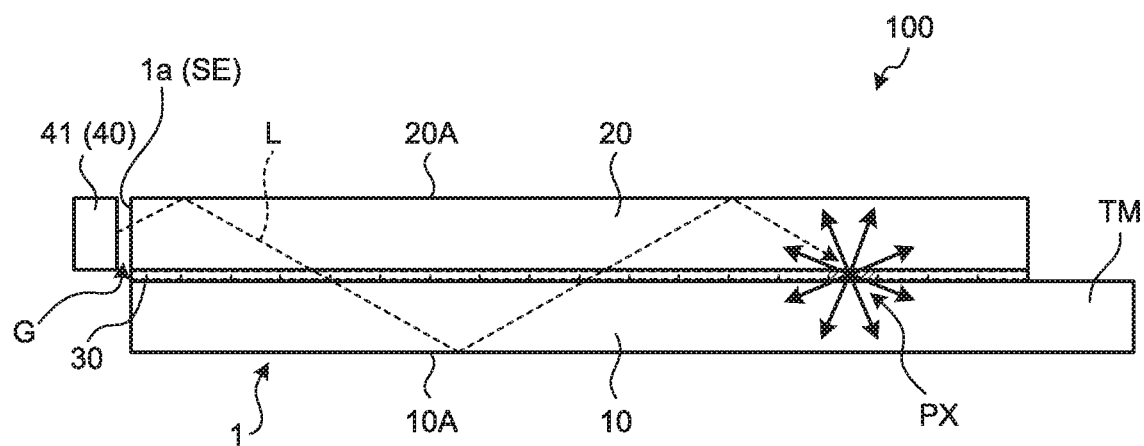
FIG. 1 is a sectional view of a display device according to a first embodiment.
Figure 2:
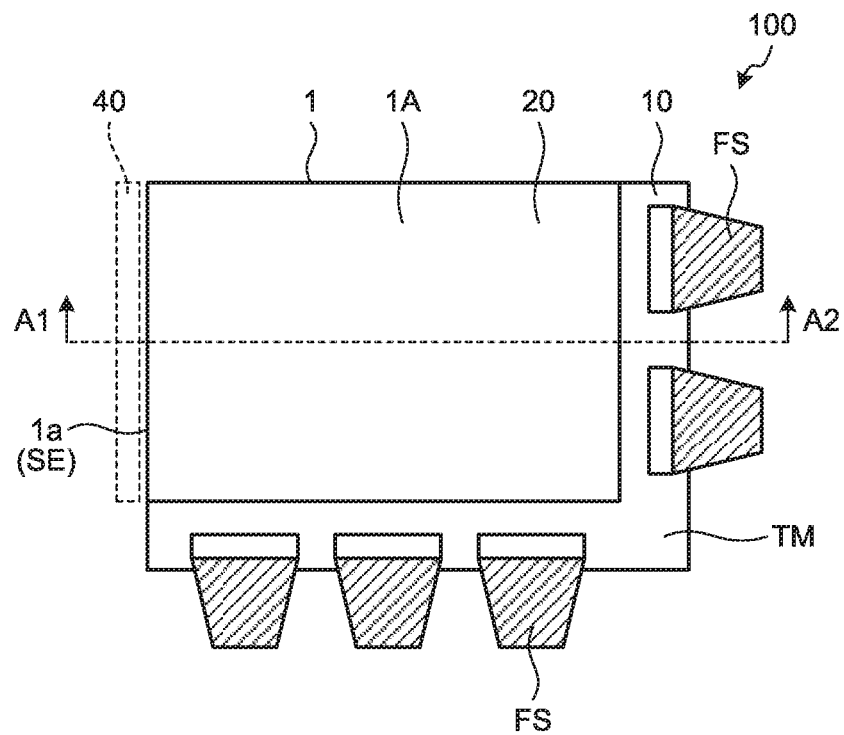
FIG. 2 is a plan view of the display device.
Figure 3:
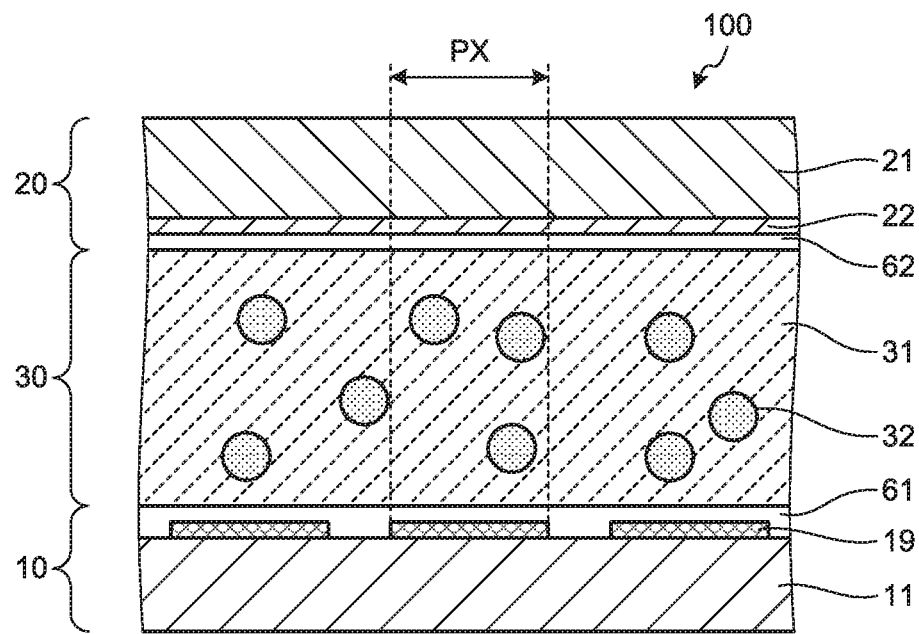
FIG. 3 is a sectional view illustrating a configuration of a liquid crystal layer.
Figure 4:
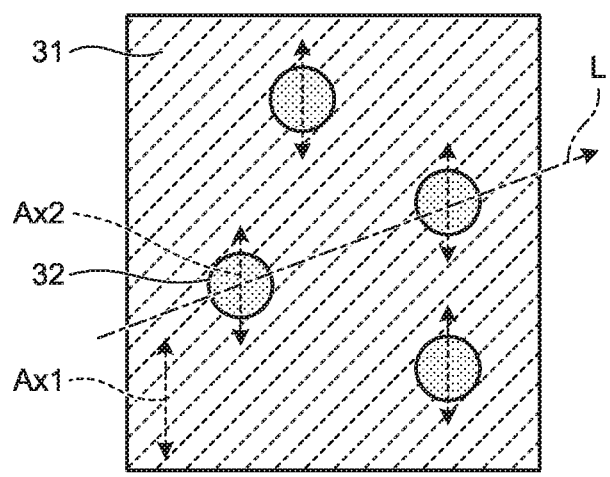
FIG. 4 is a sectional view illustrating the liquid crystal layer in a non-scattering state.
Figure 5:
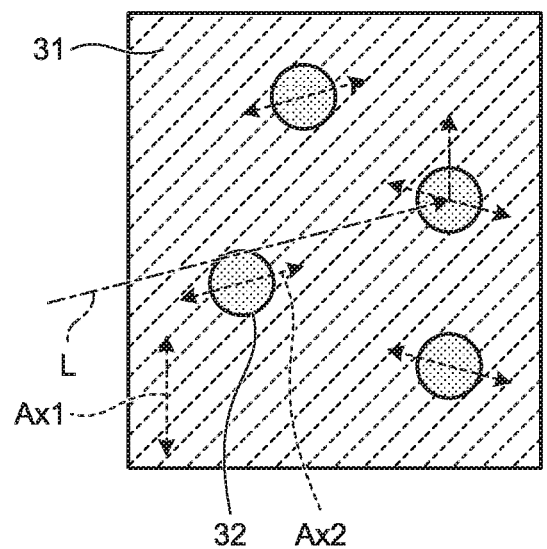
FIG. 5 is a sectional view of the liquid crystal layer in a scattering state.
Figure 6:
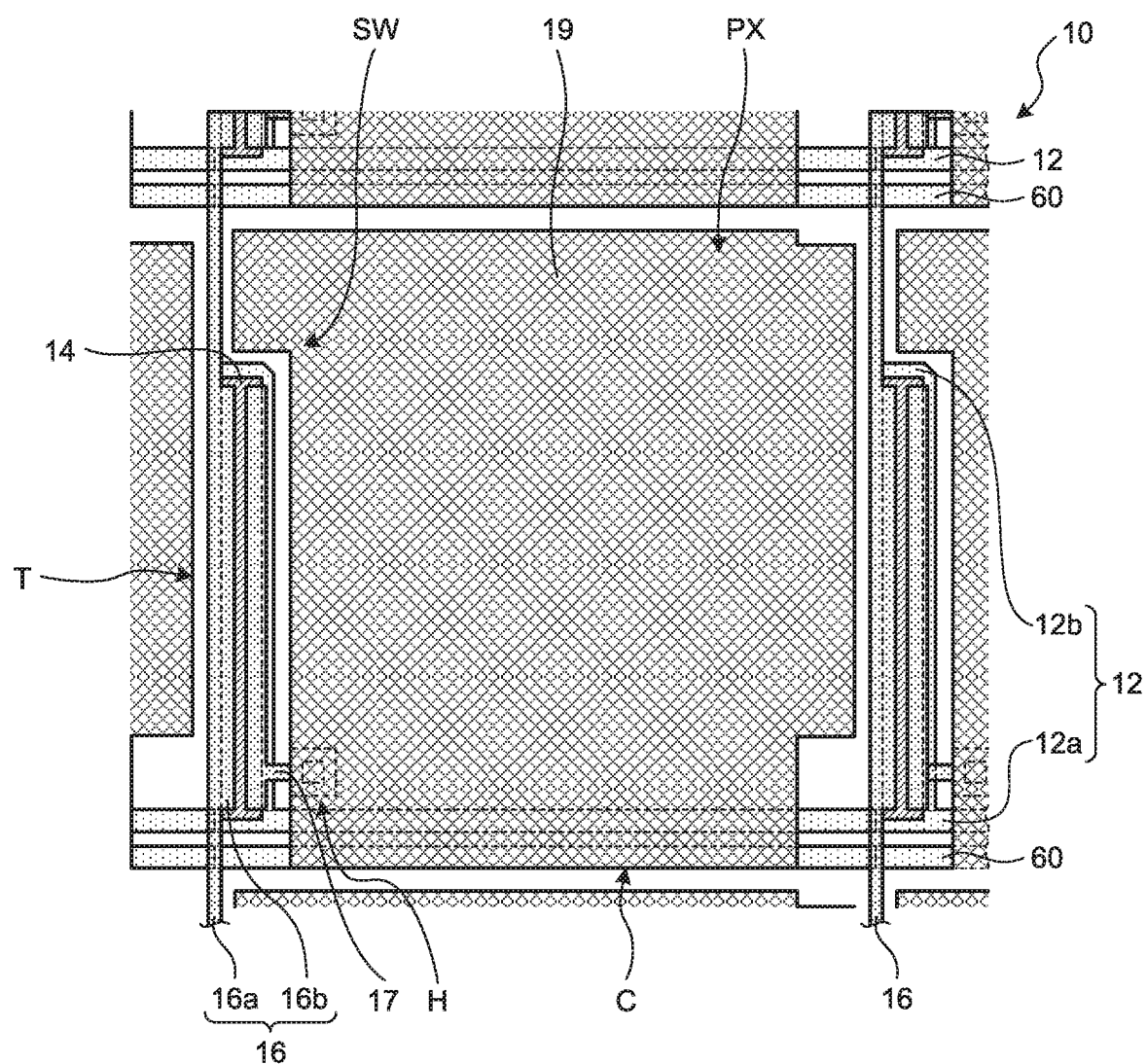
FIG. 6 is a plan view of one pixel except a reflective layer.
Figure 7:
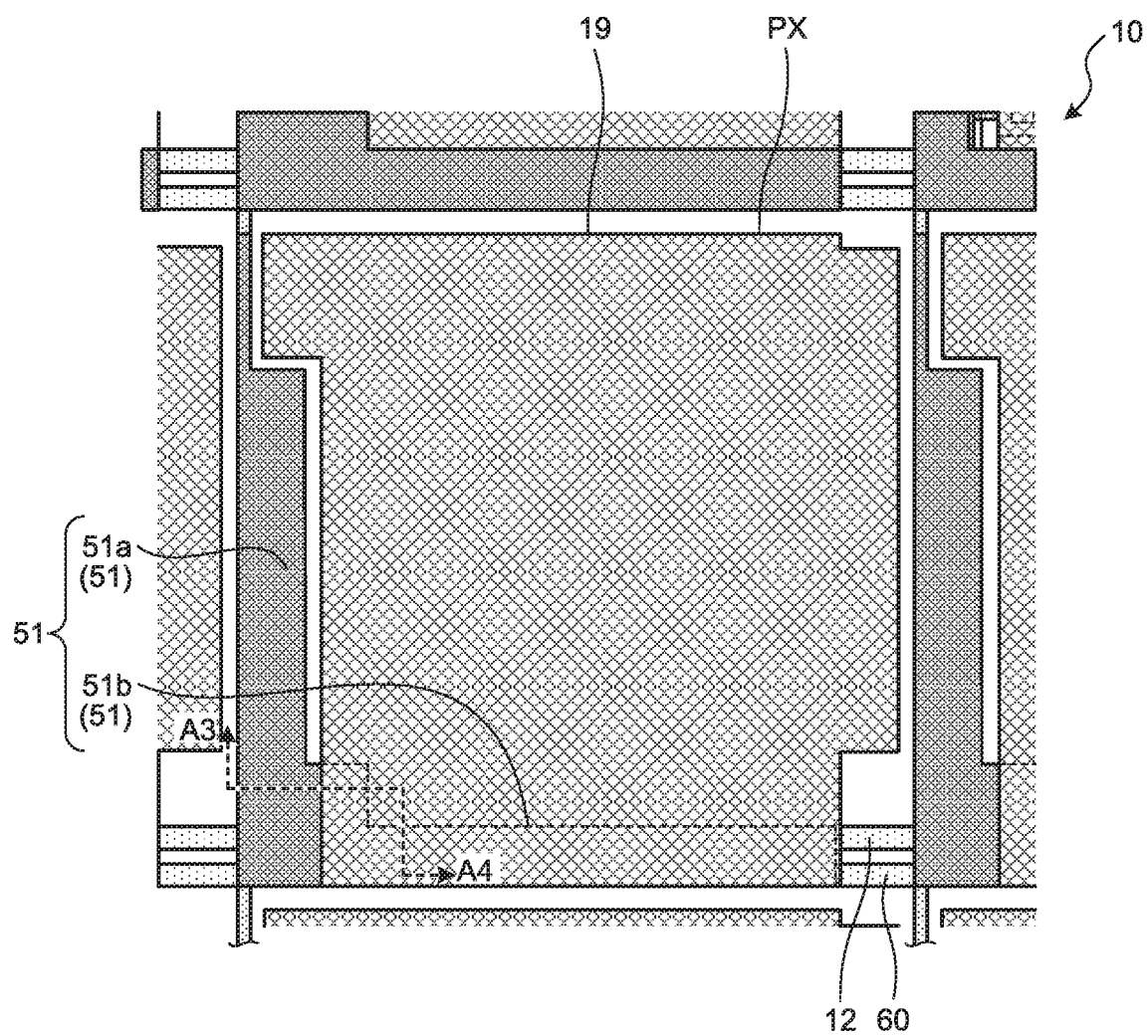
FIG. 7 is a plan view of one pixel including the reflecting layer.
Figure 8:
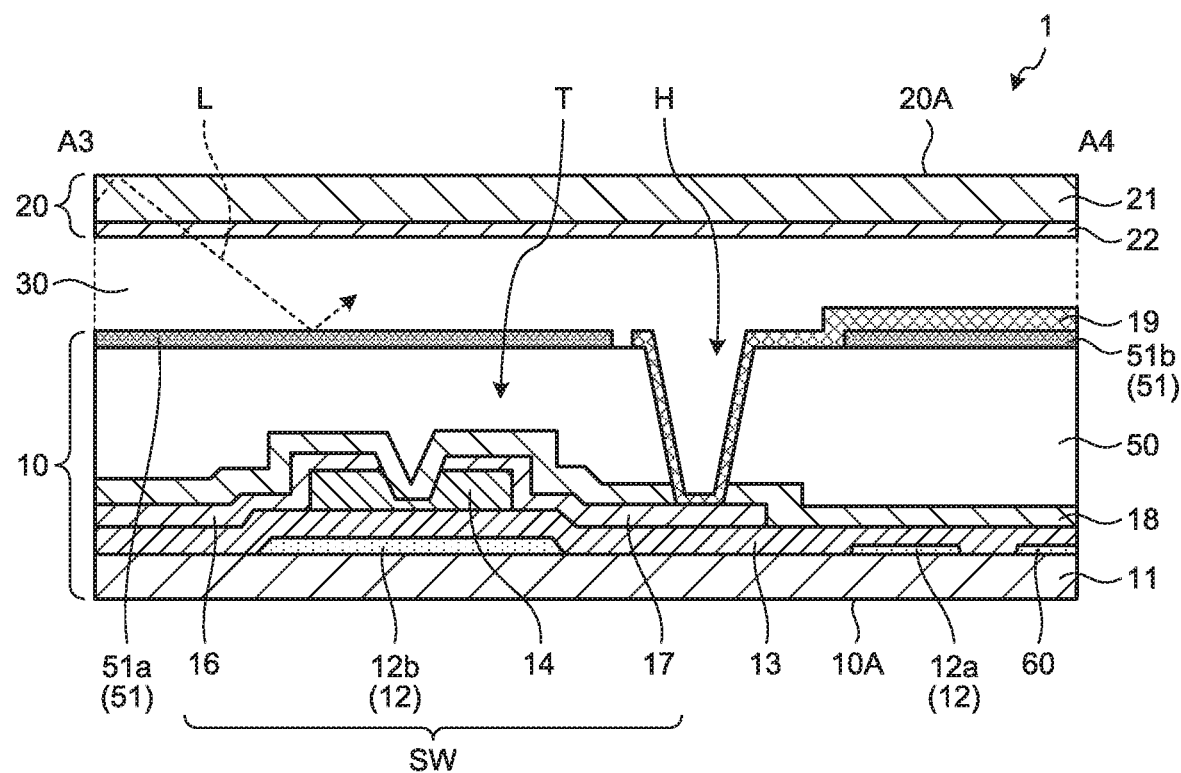
FIG. 8 is a sectional view along an A3-A4 line of FIG. 7.

FIG. 1 is a sectional view of a display device 100 according to a first embodiment. FIG. 2 is a plan view of the display device 100. FIG. 1 is a sectional view along an A1-A2 line of FIG. 2. FIG. 3 is a sectional view illustrating a configuration of a liquid crystal layer 30. FIG. 4 is a sectional view illustrating a liquid crystal layer 30 in a non-scattering state. FIG. 5 is a sectional view of the liquid crystal layer 30 in a scattering state. FIGS. 6 and 7 are plan views of one pixel PX of the display device 100. FIG. 6 is a plan view of the pixel PX except a reflecting layer 51, and FIG. 7 is a plan view of the pixel PX including the reflecting layer 51. FIG. 8 is a sectional view along an A3-A4 line of FIG. 7. Hereinafter, a state as viewed from a layer-thickness direction of the liquid crystal layer 30 is referred to as plan view, and a state as viewed from a direction perpendicular to the layer-thickness direction of the liquid crystal layer 30.

As illustrated in FIGS. 1 and 2, the display device 100 includes a display panel 1 and a light source device 40. The display panel 1 includes a first substrate 10, a second substrate 20, and a liquid crystal layer 30. The display panel 1 is provided with a plurality of pixels PX. In plan view, an overlapping area of the first substrate 10 and the second substrate 20 is a display area 1A. The display area 1A is provided with the plurality of pixels PX in a matrix manner. In plan view, the first substrate 10 includes a terminal portion TM extending to an outside of the second substrate 20. A plurality of flexible circuit substrates FS is electrically coupled with the terminal portion TM.

As illustrated in FIGS. 6 and 8, the first substrate 10 includes a pixel electrode 19 and a switching element, for example, a thin film transistor T, for each pixel PX. The second substrate 20 includes a common electrode 22 common to the pixels PX. The liquid crystal layer 30 is arranged between the pixel electrode 19 and the common electrode 22. The scattering state of the liquid crystal layer 30 is controlled for each pixel PX with a voltage applied between the pixel electrode 19 and the common electrode 22.

As illustrated in FIG. 1, in cross section view, an end portion of the display panel 1 is provided with the light source device 40. The light source device 40 is arranged over at least one end surface of the first substrate 10 and the second substrate 20. The light source device 40 irradiates a first end surface 1a of the display panel 1 with light L, for example. The first end surface 1a of the display panel 1, the first end surface 1a facing the light source device 40, is a light incident surface SE. A gap is provided between the light source device 40 and the light incident surface SE. The gap is an air layer G.

The light L emitted from the light source device 40 is propagated in a direction away from the light incident surface SE while being reflected at an outer surface (a surface on an opposite side to the liquid crystal layer 30 side) 10A of the first substrate 10 and an outer surface 20A of the second substrate 20 in cross section view. The light L propagated inside the display panel 1 is scattered in the pixel PX where the liquid crystal layer 30 is in the scattering state, and is emitted outside the display panel 1. The light L radiated to an outside of the display panel 1 is observed by an observer as image light.

As illustrated in FIG. 3, the liquid crystal layer 30 includes bulk 31 including a polymer, and a plurality of fine particles 32 dispersed in the bulk 31. The fine particles 32 include liquid crystal. The bulk 31 and the fine particles 32 have optical anisotropy.

The liquid crystal layer 30 is formed by the next method, for example. First, a solution in which liquid crystal is dispersed in a monomer for the polymer is filled between the first substrate 10 and the second substrate 20. The first substrate 10 is provided with a first orientation film 61. The second substrate 20 is provided with a second orientation film 62. The first orientation film 61 and the second orientation film 62 are, for example, vertical orientation films.

Next, the monomer is polymerized by ultraviolet rays or heat to form the bulk 31 in a state where the monomer and the liquid crystal are orientated by the first orientation film 61 and the second orientation film 62. Accordingly, the reverse mode polymer dispersed liquid crystal layer 30 is formed, in which the liquid crystal is dispersed in gaps of a polymer network formed in a mesh manner.

The orientation of the liquid crystal included in the fine particles 32 is controlled by the voltage applied between the pixel electrode 19 and the common electrode 22. With change of the orientation of the liquid crystal, the degree of scattering of the light L is changed. The liquid crystal layer 30 modulates the light L by changing the degree of scattering of the light L. The brightness of the light L radiated from the display panel 1 to an outside is changed according to the degree of scattering of the light L.

For example, as illustrated in FIG. 4, the direction of an optical axis Ax1 of the bulk 31 and the direction of an optical axis Ax2 of the fine particle 32 are equal to each other in a state where no voltage is applied between the pixel electrode 19 and the common electrode 22. The optical axis Ax2 of the fine particle 32 is parallel to the layer-thickness direction of the liquid crystal layer 30. The optical axis Ax1 of the bulk 31 is parallel to the layer-thickness direction of the liquid crystal layer 30 regardless of existence/non-existence of the voltage.

The ordinary ray refractive index of the bulk 31 and the ordinary ray refractive index of the fine particle 32 are equal to each other. The extraordinary ray refractive index of the bulk 31 and the extraordinary ray refractive index of the fine particle 32 are equal to each other. In the state where no voltage is applied between the pixel electrode 19 and the common electrode 22, a difference in the refractive index between the bulk 31 and the fine particle 32 becomes zero in every direction. The liquid crystal layer 30 is in the non-scattering state where the liquid crystal layer 30 does not scatter the light L. The light L is propagated in the direction away from the light source device 40 while being reflected between the first substrate 10 and the second substrate 20.

As illustrated in FIG. 5, in a state where the voltage is applied between the pixel electrode 19 and the common electrode 22, the optical axis Ax2 of the fine particle 32 is inclined by an electric field occurring between the pixel electrode 19 and the common electrode 22. Since the optical axis Ax1 of the bulk 31 is not changed by the electric field, the direction of the optical axis Ax1 of the bulk 31 and the direction of the optical axis Ax2 of the fine particle 32 are different from each other. The liquid crystal layer 30 is the scattering state where the liquid crystal layer 30 scatters the light L. The light L is propagated while being reflected between the first substrate 10 and the second substrate 20, and is scattered in the pixel PX in the scattering state. The scattered light L is radiated to an outside of the display panel 1, and is observed as image light.

An example in which the first orientation film 61 and the second orientation film 62 are vertical orientation films has been described. However, the first orientation film 61 and the second orientation film 62 may be horizontal orientation films. The first orientation film 61 and the second orientation film 62 may just have the function to orientate the monomer in a predetermined direction in polymerizing the monomer. Accordingly, the monomer becomes a polymerized polymer in a state of being orientated in the predetermined direction. In a case where the first orientation film 61 and the second orientation film 62 are the horizontal orientation films, the direction of the optical axis Ax1 of the bulk 31 and the direction of the optical axis Ax2 of the fine particle 32 are equal to each other and become a direction perpendicular to a film thickness direction in the state where no voltage is applied between the pixel electrode 19 and the common electrode 22. The direction perpendicular to the film thickness direction corresponds to a direction along a side of the first substrate 10 in a plan view.

As illustrated in FIG. 6, the first substrate 10 is provided with a plurality of gate lines (also referred to as scanning lines) 12 and a plurality of data lines (also referred to as signal lines) 16 in a grid manner in plan view. The pixels PX are provided corresponding to intersection portions between the plurality of gate lines 12 and the plurality of data lines 16. The pixel PX is provided with the pixel electrode 19 and the thin film transistor T. The thin film transistor T is a bottom gate thin film transistor. The thin film transistor T includes a semiconductor layer 14 superimposed with a part of the gate line 12 in plan view.

The gate line 12 includes a linearly extending main line portion 12a and a branch portion 12b branching from the main line portion 12a. The semiconductor layer 14 is superimposed with the gate line 12, for example, a central portion of the branch portion 12b. The semiconductor layer 14 is provided not to protrude from the gate line 12 in plan view. Accordingly, the light L heading toward the semiconductor layer 14 from the gate line 12 side is reflected, and leakage of the light is less likely to occur in the semiconductor layer 14. The light L reflected at the gate line 12 is propagated inside the display panel 1 and contributes to image display. The part of the gate line 12, the part being superimposed with the semiconductor layer 14 in plan view, functions as a gate electrode of the thin film transistor T.

The data line 16 includes a linearly extending main line portion 16a and a branch portion 16b branching from the main line portion 16a. The branch portion 16b is superimposed with one end portion of the semiconductor layer 14 in plan view. A portion of the branch portion 16b, the portion being superimposed with the semiconductor layer 14, function as a source electrode of the thin film transistor T.

An electrode 17 is provided in a position adjacent to the branch portion 16b across a central portion of the semiconductor layer 14 in plan view. The electrode 17 is superimposed with the other end portion of the semiconductor layer 14 in plan view. A portion of the semiconductor layer 14, the portion being not superimposed with the branch portion 16b and the electrode 17, functions as a channel forming portion of the thin film transistor T. An end portion of the electrode 17 is electrically coupled with the pixel electrode 19.

The first substrate 10 is provided with an auxiliary capacitance line 60 in a position adjacent to each gate line 12 in plan view. The gate line 12 and the auxiliary capacitance line 60 extend in parallel to each other. The auxiliary capacitance line 60 is arranged superimposed with an edge portion of the pixel electrode 19 in plan view. A portion where the pixel electrode 19 and the auxiliary capacitance line 60 are superimposed function as auxiliary capacitance C.

Driving of the pixel PX is controlled by a pixel switching circuit portion SW including the thin film transistor T. The pixel switching circuit portion SW includes, for example, the thin film transistor T arranged in the pixel PX, the gate line 12, the data line 16, and the auxiliary capacitance line 60.

As illustrated in FIG. 8, the reflecting layer 51 is arranged over the liquid crystal layer 30 side of the pixel switching circuit portion SW in cross section view. The reflecting layer 51 is separately arranged in each pixel PX. The reflecting layer 51 is partially superimposed with the pixel switching circuit portion SW of a corresponding pixel PX in plan view.

The reflecting layer 51 includes, for example, a first light shielding portion 51a extending along an extending direction of the data line 16, and a second light shielding portion 51b extending along an extending direction of the gate line 12. The semiconductor layer 14 is provided not to protrude from the first light shielding portion 51a in plan view. Large portions of the data line 16 and the gate line 12 are covered with the first light shielding portion 51a and the second light shielding portion 51b in plan view. The pixel electrode 19 is arranged superimposed with a part of the second light shielding portion 51b in plan view. The second light shielding portion 51b is electrically coupled with the pixel electrode 19 in a portion where the pixel electrode 19 and the second light shielding portion 51b are superimposed.

As illustrated in FIG. 8, the first substrate 10 includes a first base material 11 including a transparent insulating member such as glass or plastic. The gate line 12 and the auxiliary capacitance line 60 are provided on the first base material 11. The gate line 12 and the auxiliary capacitance line 60 have a structure in which a molybdenum layer, an aluminum layer, and a molybdenum layer are laminated in order, for example. A gate insulating layer 13 is provided on the first base material 11 to cover the gate line 12 and the auxiliary capacitance line 60. The gate insulating layer 13 includes, for example, a transparent inorganic insulating member such as silicon nitride.

The semiconductor layer 14 is laminated on the gate insulating layer 13. The semiconductor layer 14 includes, for example, amorphous silicon. However, the semiconductor layer 14 may include polysilicon.

The data line 16 that covers a part of the semiconductor layer 14 and the drain electrode 17 that covers a part of the semiconductor layer 14 are provided on the gate insulating layer 13. The data line 16 and the electrode 17 have a structure in which a molybdenum layer, an aluminum layer, and a molybdenum layer are laminated in order, for example. A passivation layer 18 is provided on the semiconductor layer 14, the data line 16, and the electrode 17. The passivation layer 18 includes, for example, a transparent inorganic insulating member such as silicon nitride.

An insulating layer 50 is provided on the passivation layer 18. The insulating layer 50 includes, for example, an organic insulating member such as acrylic. The insulating layer 50 is a flattening film that flattens an uneven shape formed by the pixel switching circuit portion SW.

The reflecting layer 51 and the pixel electrode 19 are provided over the insulating layer 50. The reflecting layer 51 is arranged in a position partially superimposed with the pixel switching circuit portion SW. The reflecting layer 51 includes a conductive member having higher reflectance of the light L than any members included in the pixel switching circuit portion SW. More favorably, the reflecting layer 51 includes a conductive member having higher reflectance of the light L than a member positioned on an outermost surface, of the members included in the pixel switching circuit portion SW. Alternatively, the reflecting layer 51 favorably includes a conductive member having higher reflectance than a metal member included in the pixel switching circuit portion SW. In the present embodiment, the semiconductor layer 14 includes amorphous silicon, and uppermost surfaces of the gate line 12, the data line 16, and the auxiliary capacitance line 60 include molybdenum, for example. Therefore, as a forming material of the reflecting layer 51, a metal member having high optical reflectance, such as aluminum or silver, is favorable.

The pixel electrode 19 includes a transparent conductive member such as indium tin oxide (ITO). The pixel electrode 19 is electrically coupled with the drain electrode 17 through a contact hole H provided in the insulating layer 50 and the passivation layer 18. The pixel electrode 19 is arranged to run over a part of the reflecting layer 51 in plan view. The reflecting layer 51 is electrically coupled with the pixel electrode 19 in a portion where the pixel electrode 19 and the reflecting layer 51 are in contact.

The second substrate 20 includes a second base material 21 including a transparent insulating member such as glass or plastic. The common electrode 22 is provided on the second base material 21. The common electrode 22 includes a transparent conductive member such as ITO. The second substrate 20 is arranged to face the first substrate 10. The liquid crystal layer 30 is arranged between the first substrate 10 and the second substrate 20. The liquid crystal layer 30 modulates the light L. The light L is propagated while reflected between the first substrate 10 and the second substrate 20.

In the display device 100 of the present embodiment described above, an upper portion of the pixel switching circuit portion SW is covered with the reflecting layer 51 having high optical reflectance in cross section view. Therefore, the light L traveling toward the pixel switching circuit portion SW is reflected by the reflecting layer 51 and does not intrude into the pixel switching circuit portion SW when propagated while reflected between the first substrate 10 and the second substrate 20. Therefore, attenuation of the light L caused by absorption of the light L in the pixel switching circuit portion SW is less likely to occur. Further, the light L is less likely to enter the semiconductor layer 14 included in the pixel switching circuit portion SW, and thus light leakage of the thin film transistor is suppressed. Since the reflecting layer 51 is electrically coupled with the pixel electrode 19, the potential of the reflecting layer 51 is stabilized. Therefore, display failure is less likely to occur.

Figure 9:
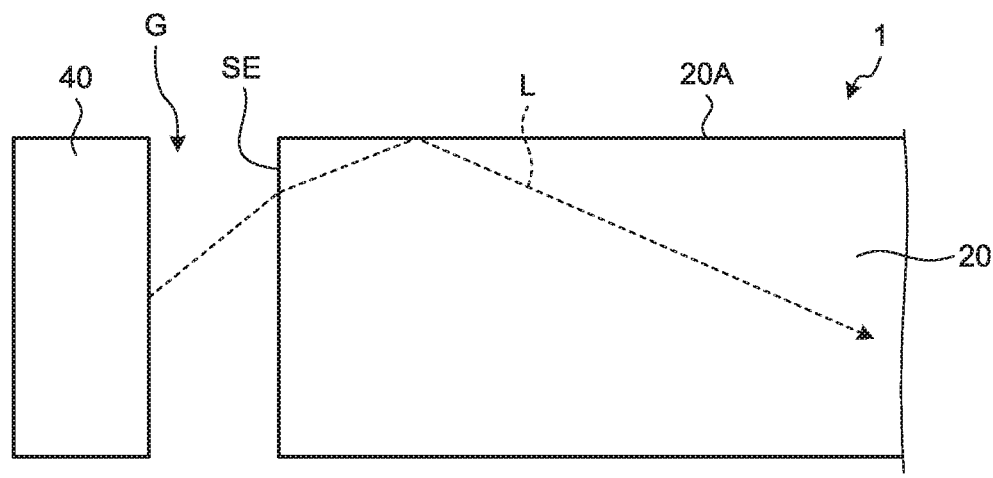
FIG. 9 is a diagram for describing behavior of incident light in a case where there is a gap between a light source device and a light incident surface.
Figure 10:
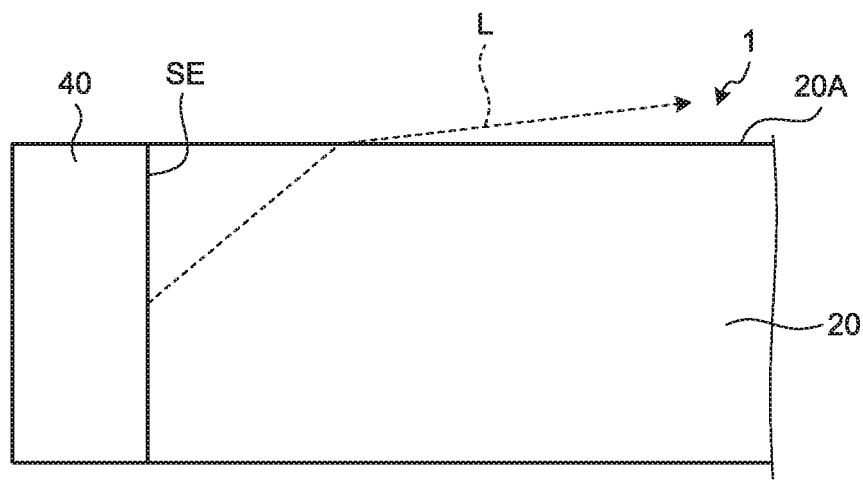
FIG. 10 is a diagram for describing behavior of incident light in a case where there is no gap between the light source device and the light incident surface.

In the present embodiment, as illustrated in FIG. 9, the air layer G is provided between the light source device 40 and the light incident surface SE of the display panel 1. The light L emitted from the light source device 40 enters the light incident surface SE of the display panel 1 through the air layer G. The light L is refracted at the light incident surface SE, and enters the outer surface 20A of the second substrate 20 at a shallow angle. Therefore, the light L is less likely to leak outside the display panel 1 from the outer surface 20A. For example, as illustrated in FIG. 10, in a case where the light source device 40 and the light incident surface SE are in contact with each other, the light L emitted from the light source device 40 enters the outer surface 20A without being refracted at the light incident surface SE. Therefore, the angle to enter the outer surface 20A becomes large. Therefore, the light L may leak outside the display panel 1 without being totally reflected at the outer surface 20A. In the present embodiment, the amount of the light L leaking outside the display panel 1 is small, and thus a bright image can be obtained.

Second Embodiment

Figure 11:
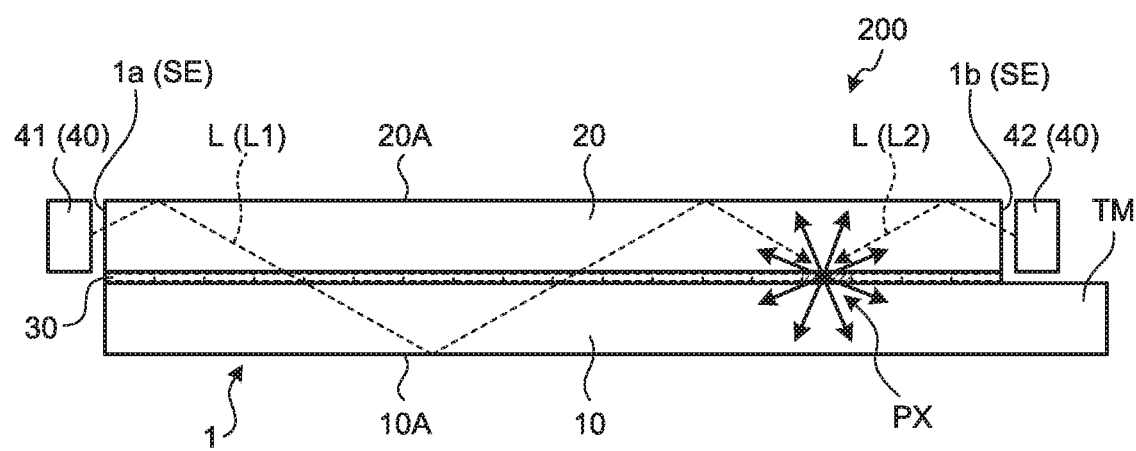
FIG. 11 is a sectional view of a display device according to a second embodiment.
Figure 12:
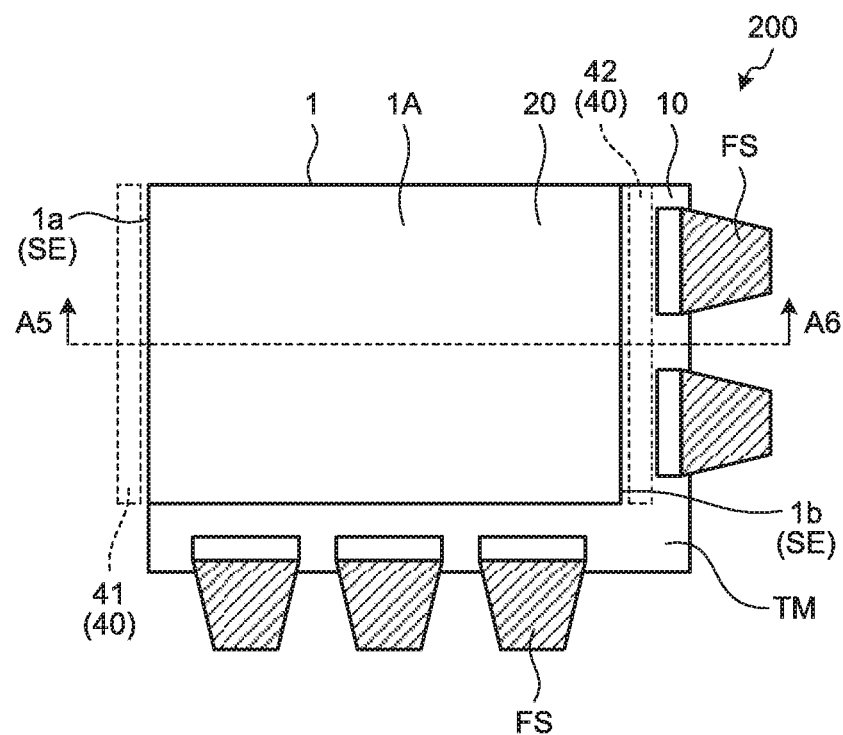
FIG. 12 is a plan view of the display device.

FIG. 11 is a sectional view of a display device 200 according to a second embodiment. FIG. 12 is a plan view of the display device 200. FIG. 11 is a sectional view along an A5-A6 line of FIG. 12. In the present embodiment, a configuration element common to the first embodiment is denoted with the same reference sign, and detailed description is omitted.

A different point in the present embodiment from the first embodiment is that a plurality of light source devices 40 is provided around a display panel 1 in plan view. For example, the display device 200 is provided with a first light source device 41 and a second light source device 42 as the plurality of light source devices 40. The first light source device 41 and the second light source device 42 are arranged in facing positions across the display panel 1 in cross section view. The first light source device 41 irradiates a first end surface 1a of the display panel 1 with first light L1. The second light source device 42 irradiates a second end surface 1b of the display panel 1 with second light L2.

The first light L1 has intensity distribution in which the intensity is highest on the first end surface 1a and is smallest on the second end surface 1b. The second light L2 has intensity distribution in which the intensity is highest on the second end surface 1b and is smallest on the first end surface 1a. The intensity distribution of the first light L1 and the intensity distribution of the second light L2 complement each other, thereby to realize uniform intensity distribution on an entire display area 1A. The light L enters the display panel 1 from the plurality of light source devices 40, whereby a bright image can be obtained.

Third Embodiment

Figure 13:
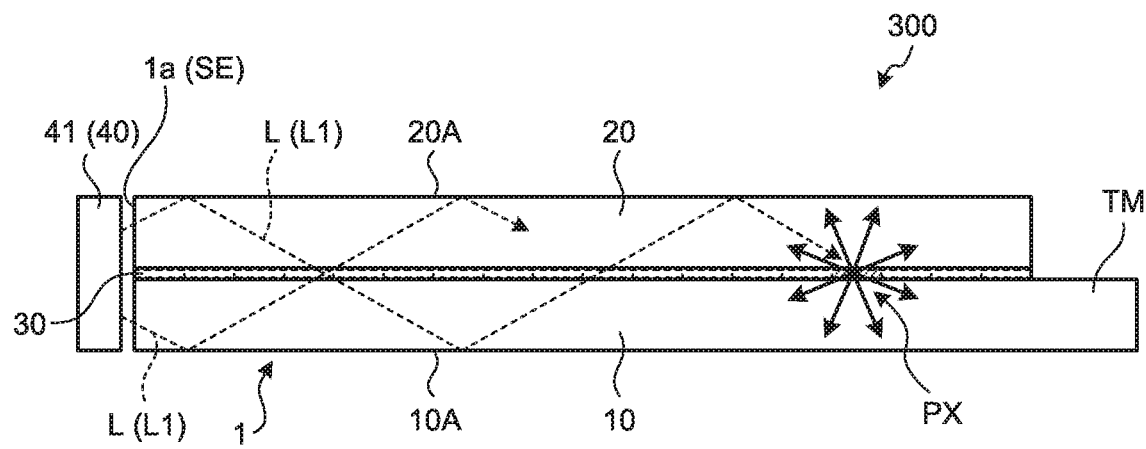
FIG. 13 is a sectional view of a display device according to a third embodiment.
Figure 14:
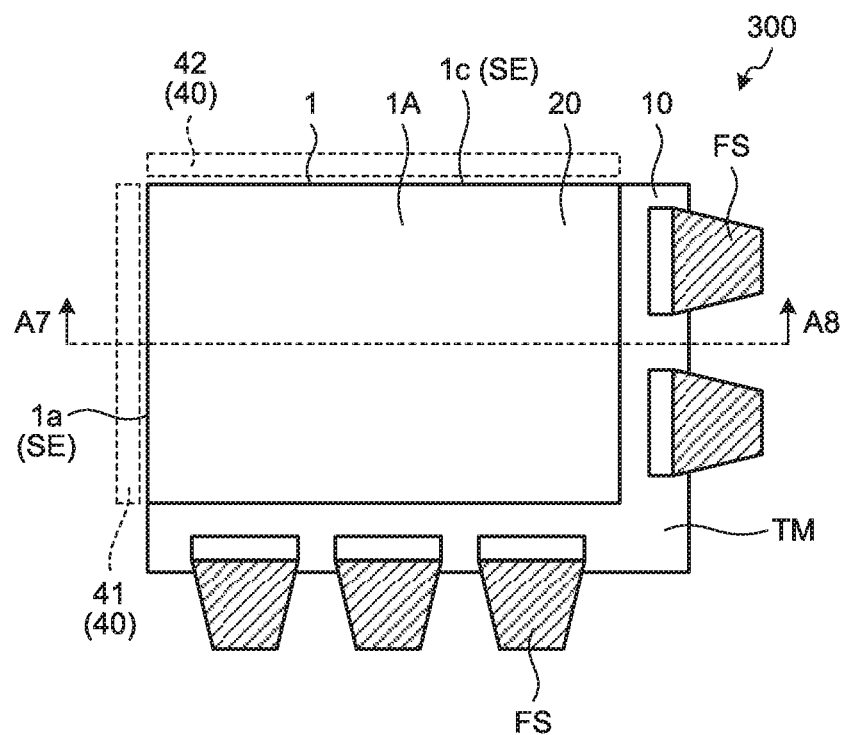
FIG. 14 is a plan view of the display device.

FIG. 13 is a sectional view of a display device 300 according to a third embodiment. FIG. 14 is a plan view of the display device 300. FIG. 13 is a sectional view along an A7-A8 line of FIG. 14. In the present embodiment, a configuration element common to the first embodiment is denoted with the same reference sign, and detailed description is omitted.

Different points in the present embodiment from the first embodiment are that a plurality of light source devices 40 is provided around a display panel 1 in plan view, and the light source devices 40 have a height comparable to the thickness of the display panel 1 in cross section view.

For example, the display device 300 is provided with a first light source device 41 and a third light source device 43 as the plurality of light source device 40. The first light source device 41 irradiates a first end surface 1a of the display panel 1 with first light L1. The third light source device 43 irradiates a third end surface 1c of the display panel 1 with third light L3. The third end surface 1c is provided in a position adjacent to the first end surface 1a across a corner portion of a display area 1A in plan view. The light source devices 40 are arranged to face both of a first substrate 10 and a second substrate 20. The light source devices 40 cause light L to enter both of an end surface of the first substrate 10 and an end surface of the second substrate 20 at the same time.

With this configuration, the light L enters the display panel 1 from the plurality of light source devices 40, and thus a bright image can be obtained.

Fourth Embodiment

Figure 15:
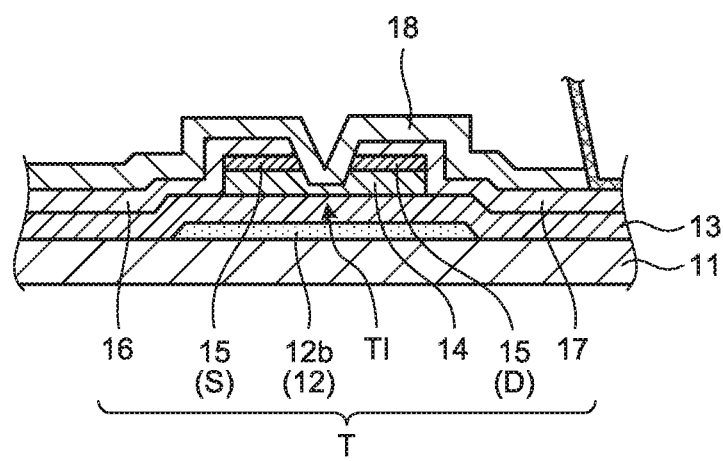
FIG. 15 is a sectional view illustrating a variation of a thin film transistor.
Figure 16:
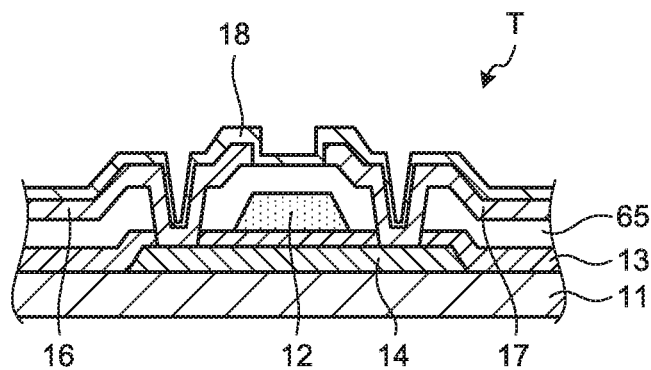
FIG. 16 is a sectional view illustrating a variation of a thin film transistor.

FIGS. 15 and 16 are sectional views of variations of thin film transistors T. In the present embodiment, a configuration element common to the first embodiment is denoted with the same reference sign, and detailed description is omitted.

In the first embodiment, a bottom gate thin film transistor using amorphous silicon has been used as the thin film transistor T. However, the configuration of the thin film transistor T is not limited thereto. For example, various thin film transistors T as illustrated in FIGS. 15 and 16 can be used.

FIG. 15 is a diagram illustrating a bottom gate thin film transistor provided with a high concentration impurity semiconductor layer 15 between a data line 16 and a semiconductor layer 14 and between an electrode 17 and the semiconductor layer 14 in cross section view.

The semiconductor layer 14 and the high concentration impurity semiconductor layer 15 are laminated in order on a gate insulating layer 13 in cross section view. The semiconductor layer 14 includes, for example, amorphous silicon. The high concentration impurity semiconductor layer 15 includes, for example, n+ amorphous silicon. The high concentration impurity semiconductor layer 15 is separated into a source portion S and a drain portion D by a separation groove TI (channel etch portion). The semiconductor layer 14 exposed to a bottom surface of the separation groove TI functions as a channel forming portion of the thin film transistor T. The data line 16 that covers the source portion S and the drain electrode 17 that covers the drain portion D are provided on the gate insulating layer 13.

FIG. 15 illustrates an example of a channel etch thin film transistor having the separation groove TI formed in the semiconductor layer 14. However, a channel stopper thin film transistor in which an insulating layer that separates a source area and a drain area is formed on the semiconductor layer 14 may be used.

FIG. 16 is a diagram illustrating a top gate thin film transistor T. A semiconductor layer 14, a gate insulating layer 13, a gate line 12, and an interlayer insulating layer 65 are laminated in order on a first base material 11 in cross section view. A portion of the semiconductor layer 14, the portion superimposed with the gate line 12 in plan view, functions as a channel forming portion. The semiconductor layer 14 includes low-temperature polysilicon (LTPS), for example. However, the semiconductor layer 14 may include an oxide semiconductor containing oxides of indium (In), gallium (Ga), and zinc (Zn).

A data line 16 and an electrode 17 are provided on the interlayer insulating layer 65. The data line 16 is electrically coupled with the semiconductor layer 14 through a contact hole provided in the interlayer insulating layer 65. The electrode 17 is electrically coupled with the semiconductor layer 14 through a contact hole provided in the interlayer insulating layer 65.

The configurations of the thin film transistors T illustrated in FIGS. 15 and 16 are examples. A thin film transistor T having a configuration other than the configurations illustrated in FIGS. 15 and 16 is also applicable.

Fifth Embodiment

Figure 17:
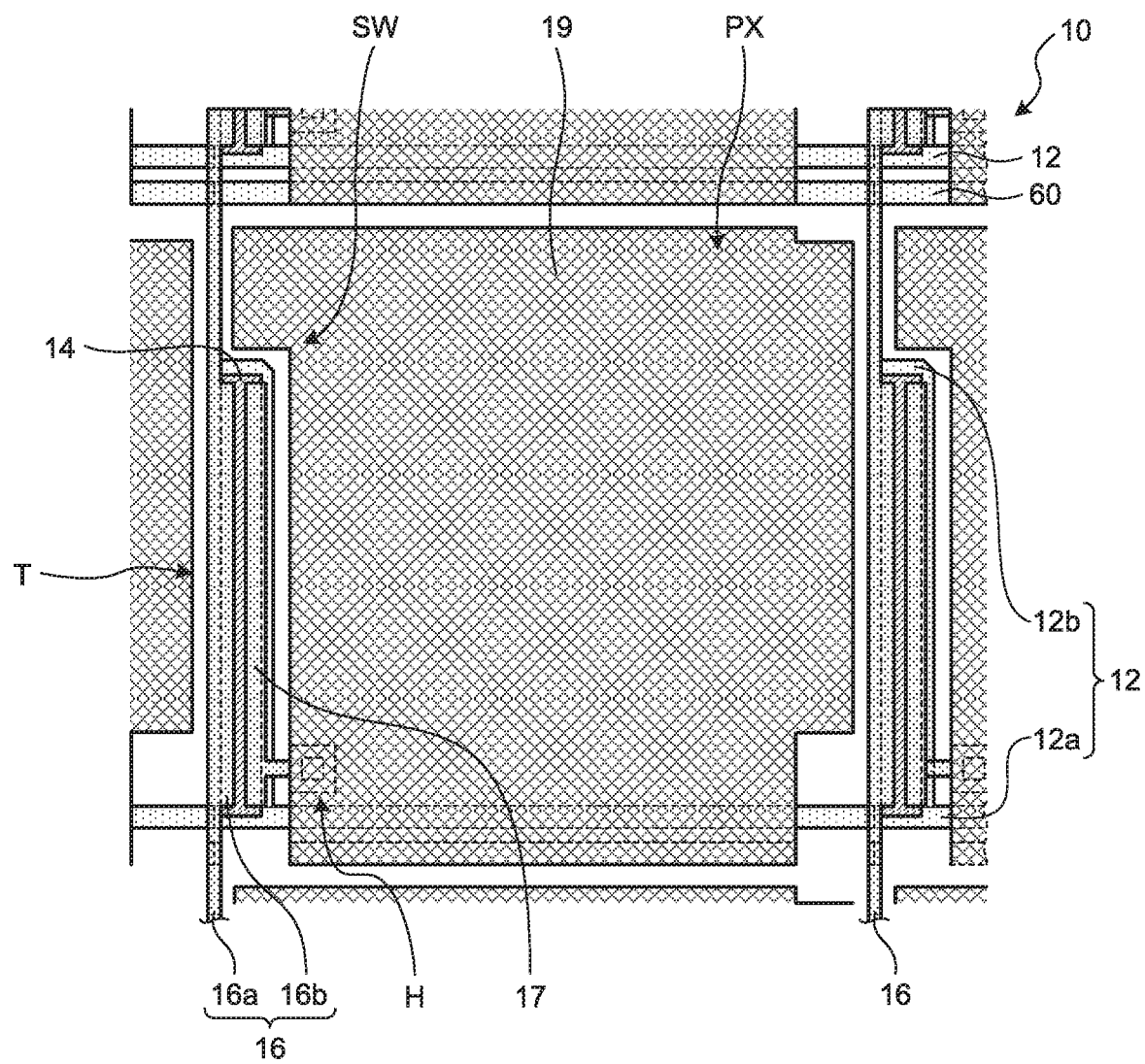
FIG. 17 is a sectional view illustrating a variation of a pixel switching circuit portion.

FIG. 17 is a sectional view illustrating a variation of a pixel switching circuit portion SW. In the present embodiment, a configuration element common to the first embodiment is denoted with the same reference sign, and detailed description is omitted.

In the first embodiment, the auxiliary capacitance line 60 is provided in the position adjacent to each gate line 12. However, an auxiliary capacitance line may not be required depending on design. FIG. 17 illustrates a case not provided with the auxiliary capacitance line. In this configuration, light L is not absorbed in the auxiliary capacitance line, and thus attenuation of the light L is less likely to occur.

Sixth Embodiment

Figure 18:
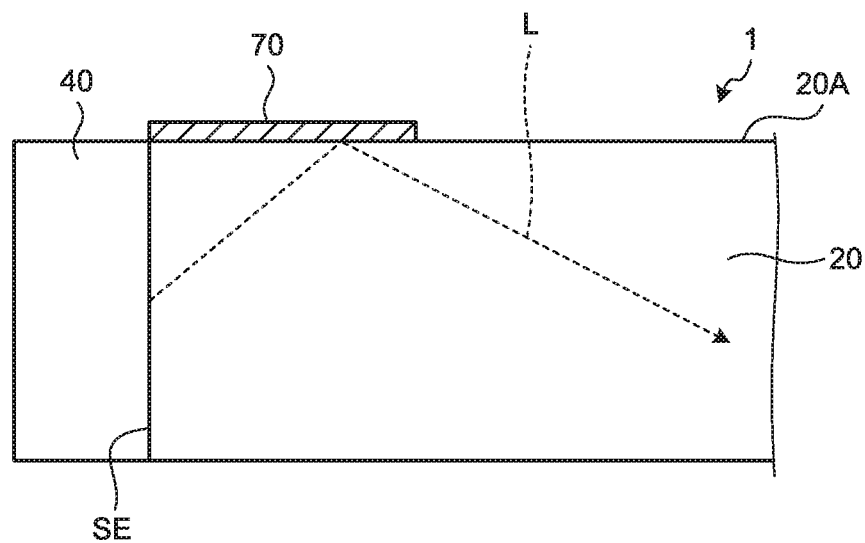
FIG. 18 is a sectional view illustrating a variation of arrangement of a light source device.

FIG. 18 is a sectional view illustrating a variation of arrangement of a light source device 40.

In the first embodiment, the air layer G is provided between the light source device 40 and the light incident surface SE to suppress leakage of the light L, which has entered the light incident surface SE, by directly passing through the display panel 1. In the present embodiment, a reflecting layer 70 is provided in a position where leakage of light occurs, in place of providing an air layer G between a light source device 40 and a light incident surface SE. A range to provide the reflecting layer 70 is determined according to a refractive index of a second substrate 20 and a flare angle of light L. The reflecting layer 70 is provided in a range in which the light L enters an outer surface 20A at an angle smaller than a critical angle.

According to this configuration, the distance between the light incident surface SE and the light source device 40 becomes short, and thus a terminal portion TM can be made small. Therefore, downsizing of the display device can be achieved while suppressing leakage of the light from the display panel 1.

Favorable embodiments of the present invention have been described. However, the present invention is not limited to these embodiments. The content disclosed in the embodiments is merely examples, various modifications can be made without departing from the points of the present invention. Appropriate modifications made without departing from the points of the present invention obviously belong to the technical scope of the present invention. All of inventions that would be appropriately designed and modified, and implemented by a person skilled in the art on the basis of the above-described invention also belong to the technical scope of the present invention as long as the inventions include the gist of the present invention.

For example, in the above-described embodiment, only a part of the reflecting layer 51 is covered with the pixel electrode 19. However, the configuration of the pixel electrode 19 is not limited thereto. For example, a pixel electrode 19 may cover the entire surface of a reflecting layer 51. In a case where the reflecting layer 51 includes a metal member such as aluminum, oxidation of the surface of the reflecting layer 51 can be suppressed by being covered with the pixel electrode 19.

The present invention can be widely applied to a display device according to the following aspects.

(1) A display device including:
a first substrate including at least a pixel electrode and a pixel switching circuit portion;
a second substrate arranged to face the first substrate;
a liquid crystal layer arranged between the first substrate and the second substrate, and configured to modulate light, the light being propagated while reflected between the first substrate and the second substrate; and
a reflecting layer arranged over a liquid crystal layer side of the pixel switching circuit portion, partially superimposed with the pixel switching circuit portion, and electrically coupled with the pixel electrode, wherein
the reflecting layer has higher reflectance of the light than any members included in the pixel switching circuit portion.

(2) The display device according to (1), wherein
the pixel electrode covers an entire surface of the reflecting layer.

(3) The display device according to (1) or (2), wherein
the pixel switching circuit portion includes at least a thin film transistor, at least a gate line, and at least a data line.

(4) The display device according to any one of (1) to (3), wherein
the first substrate includes a flattening film arranged over the pixel switching circuit portion, and
the reflecting layer is arranged over the flattening film.

(5) The display device according to any one of (1) to (4), including:

a light source device arranged over at least one end surface of the first substrate and the second substrate, wherein light entering from the light source device is propagated while reflected between the first substrate and the second substrate.

(6) The display device according to any one of (1) to (5), wherein the liquid crystal layer is a polymer dispersed liquid crystal layer.

(7) The display device according to any one of (1) to (6), wherein the second substrate includes a common electrode, and a scattering state of the liquid crystal layer is controlled with a voltage applied between the pixel electrode and the common electrode.

What is claimed is:

1. A display device comprising:
    a first substrate including at least a pixel electrode and a pixel switching circuit portion;
    a second substrate arranged to face the first substrate and including a common electrode;
    a polymer dispersed liquid crystal layer arranged between the pixel electrode on the first substrate and the common electrode on the second substrate, the polymer dispersed liquid crystal layer including
        a fine particle that includes liquid crystal and
        bulk that is formed by polymerizing monomer;
    a reflecting layer, partially superimposed with the pixel switching circuit portion, and electrically coupled with the pixel electrode; and
    a light source device disposed facing at least one end surface of the first substrate and the second substrate, wherein
    the first substrate has an outer surface and an inner surface that is opposite to the outer surface
    the second substrate has an outer surface and an inner surface that is opposite to the outer surface, the inner surface of the second substrate facing the inner surface of the first substrate,
    the outer surface of the second substrate is a top surface of the display device, and
    a direction of an optical axis of the bulk and a direction of an optical axis of the fine particle are:
        in a state where no voltage is applied between the pixel electrode and the common electrode, equal to each other so that the polymer dispersed liquid crystal layer is in a non-scattering state, allowing light entering from the light source device to be propagated in a direction away from the light source device while being reflected between the top surface of the display device and the first substrate; and
        in a state where a voltage is applied between the pixel electrode and the common electrode, different from each other so that the polymer dispersed liquid crystal layer is in a scattering state, allowing the light entering from the light source device to be propagated and scattered while being reflected between the top surface of the display device and the first substrate.

2. The display device according to claim 1, wherein the pixel electrode covers an entire surface of the reflecting layer.

3. The display device according to claim 1, wherein the pixel switching circuit portion includes a thin film transistor, a gate line, and a data line.

4. The display device according to claim 1, wherein the first substrate includes a flattening film arranged over the pixel switching circuit portion, and the reflecting layer is arranged over the flattening film.

5. The display device according to claim 1, wherein the reflecting layer has higher reflectance of the light than any members included in the pixel switching circuit portion.

6. The display device according to claim 1, wherein
    the reflecting layer includes a first light shielding portion extending along an extending direction of the data line and a second light shielding portion extending along an extending direction of the gate line,
    the first light shielding portion overlaps the data line in plan view, and
    the second light shielding portion overlaps the gate line in plan view.

7. The display device according to claim 1, wherein
    the light entering from the light source device is propagated while being reflected by the top surface of the display device, transmitting through the common electrode on the second substrate and through the polymer dispersed liquid crystal layer, and being reflected by the reflecting layer covered at least partially by the pixel electrode of the first substrate.

8. The display device according to claim 1, wherein
    the light, which enters from the light source device disposed facing one end surface of the second substrate, is propagated while being reflected by the top surface of the display device, transmitting through the common electrode on the second substrate and through the polymer dispersed liquid crystal layer, and being reflected by the reflecting layer covered at least partially by the pixel electrode of the first substrate.

9. The display device according to claim 1, wherein
    the light source device comprises a pair of the light source devices that are disposed over opposed end surfaces of the second substrate, and
    the light, which enters from the pair of the light source devices arranged in facing positions across the second substrate in a cross sectional view, is propagated while being reflected by the top surface of the display device, transmitting through the common electrode on the second substrate and through the polymer dispersed liquid crystal layer, and being reflected by the reflecting layer covered at least partially by the pixel electrode of the first substrate.

10. The display device according to claim 1, wherein
    the light source device has a height that is a combined thickness of the first substrate and the second substrate in a cross sectional view, and
    the light, which enters from the light source device disposed facing end surfaces of a same side of the first substrate and the second substrate, is propagated while being reflected by the top surface of the display device, transmitting through the common electrode on the second substrate and through the polymer dispersed liquid crystal layer, and being reflected by the reflecting layer covered at least partially by the pixel electrode of the first substrate.

11. The display device according to claim 1, wherein
    the light, which enters from the light source device disposed facing end surfaces of the first substrate and the second substrate, and an end portion of the polymer dispersed liquid crystal layer, is propagated while being reflected by the top surface of the display device, transmitting through the common electrode on the second substrate and through the polymer dispersed liquid crystal layer, and being reflected by the reflecting layer covered at least partially by the pixel electrode of the first substrate.

12. The display device according to claim 1, wherein
in the state where the voltage is applied between the pixel electrode and the common electrode, the optical axis of the fine particle is inclined by an electric field occurring between the pixel electrode and the common electrode, while the optical axis of the bulk is not changed by the electric field.

13. The display device according to claim 1, wherein
the direction of an optical axis of the bulk and the direction of an optical axis of the fine particle are:
  in the state where no voltage is applied between the pixel electrode and the common electrode, equal to each other so that the polymer dispersed liquid crystal layer is in the non-scattering state, allowing light entering from the light source device to be propagated in the direction away from the light source device while being reflected between the first substrate on which the pixel electrode at least partially covering a surface of the reflecting layer is disposed and the second substrate on which the common electrode is disposed; and
  in the state where the voltage is applied between the pixel electrode and the common electrode, different from each other so that the polymer dispersed liquid crystal layer is in the scattering state, allowing the light entering from the light source device to be propagated and scattered while being reflected between the first substrate on which the pixel electrode at least partially covering the surface of the reflecting layer is disposed and the second substrate on which the common electrode is disposed.

* * * * *